(12) United States Patent
Ishikawa et al.

(10) Patent No.: US 12,399,162 B2
(45) Date of Patent: Aug. 26, 2025

(54) WAVEFORM PROCESSING DEVICE FOR CHROMATOGRAM AND WAVEFORM PROCESSING METHOD FOR CHROMATOGRAM

(71) Applicant: SHIMADZU CORPORATION, Kyoto (JP)

(72) Inventors: Yuki Ishikawa, Kyoto (JP); Hiroaki Kozawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 358 days.

(21) Appl. No.: 17/494,877

(22) Filed: Oct. 6, 2021

(65) Prior Publication Data

US 2022/0107294 A1 Apr. 7, 2022

(30) Foreign Application Priority Data

Oct. 6, 2020 (JP) .................................. 2020-169409

(51) Int. Cl.
   - *G01N 30/86* (2006.01)
   - *G01N 30/02* (2006.01)
   - *G01N 30/72* (2006.01)

(52) U.S. Cl.
   CPC ..... *G01N 30/8675* (2013.01); *G01N 30/7233* (2013.01); *G01N 2030/027* (2013.01)

(58) Field of Classification Search
   CPC ........... G01N 30/8675; G01N 30/7233; G01N 2030/027
   See application file for complete search history.

(56) References Cited

U.S. PATENT DOCUMENTS

| | | | |
|---|---|---|---|
| 6,989,100 B2 | 1/2006 | Norton | |
| 7,365,311 B1 * | 4/2008 | Cetto | H01J 49/0036 |
| | | | 702/30 |

(Continued)

FOREIGN PATENT DOCUMENTS

| | | | | |
|---|---|---|---|---|
| JP | 07-128317 A | | 5/1995 | |
| JP | H07128317 | * | 5/1995 | ............. G01N 30/86 |

(Continued)

OTHER PUBLICATIONS

Honghua, Liao, Study on Electro-Chromatography Signal Denoising of Low-Voltage Capillary Electrophoresis Micro-Chip Based on Generalized Morphological Filtering, Dec. 2014, Journal of Hubei University, pp. 439-444 (Year: 2014).*

(Continued)

*Primary Examiner* — Lisa M Caputo
*Assistant Examiner* — Sharah Zaab
(74) *Attorney, Agent, or Firm* — Renner, Otto, Boisselle & Sklar, LLP

(57) ABSTRACT

A sample chromatogram produced by measurement of a mobile phase into which a sample has been injected is acquired by a sample chromatogram acquirer. A background chromatogram produced by measurement of a mobile phase into which a sample is not injected or a mobile phase into which a control sample is injected is acquired by a background chromatogram acquirer. Alignment of a sample chromatogram and a background chromatogram is performed by an alignment processor by causing of baselines of the acquired sample chromatogram and the acquired background chromatogram to coincide with each other. Subtraction processing of subtracting a background chromatogram from a sample chromatogram after alignment is executed by a subtraction processor.

14 Claims, 9 Drawing Sheets

(56) References Cited

U.S. PATENT DOCUMENTS

| | | | |
|---|---|---|---|
| 2004/0113062 A1* | 6/2004 | Norton | G01N 30/8668 250/282 |
| 2005/0048547 A1* | 3/2005 | Zhao | H01J 49/00 435/6.12 |
| 2008/0059079 A1 | 3/2008 | Watabe et al. | |
| 2010/0082263 A1 | 4/2010 | Watabe et al. | |
| 2012/0310546 A1 | 12/2012 | Watabe et al. | |
| 2014/0235503 A1* | 8/2014 | Kim | G01N 33/743 702/19 |
| 2020/0035325 A1 | 1/2020 | Gao et al. | |

FOREIGN PATENT DOCUMENTS

| | | |
|---|---|---|
| JP | 10-339727 A | 12/1998 |
| JP | 5068498 B2 | 11/2012 |
| JP | 2017-187319 A | 10/2017 |

OTHER PUBLICATIONS

"Correlation optimized warping and dynamic time warping as preprocessing methods for chromatographic data", GiorgioTomasi, Frans van den Berg and, Claus Andersson, J. Chemometrics 2004, 18, pp. 231-241.

"Alignment Using Variable Penalty Dynamic Time Warping", David Clifford, Glenn Stone, Ivan Montoliu, Serge Rezzi, Francois-Pierre Martin, Philippe Guy, Stephen Bruce, Sunil Kochhar, Analytical Chemistry, vol. 81, No. 3, Feb. 1, 2009.

"Variable Penalty Dynamic Time Warping Code for Aligning Mass Spectrometry Chromatograms in R", David Clifford, Glenn Stone, Journal of Statistical Software, Apr. 2012, vol. 47, Issue 8.

"Improved parametric time warping for proteomics", Tom G. Bloemberg, Jan Gerretzen, Hans J.P. Wouters, Jolein Gloerich, Maurice van Dael, Hans J.C.T. Wessels, Lambert P. van den Heuvel, Paul H.C. Eilers, Lutgarde M.C. Buydens, Ron Wehrens, Chemometrics and Intelligent Laboratory Systems, vol. 104, pp. 65-74, Available online Apr. 22, 2010.

"Time-warping algorithm Applied to Chromatographic Peak Matching Gas Chromatography/Fourier Transform Infrared/Mass Spectrometry", Ching Po Wang, Thomas L. Isenhour, American Chemical Society, 1987, 59, pp. 649-654.

"Wavelet-based dynamic time warping", Sylvio Barbon Jr., Rodrigo Capobianco Guido, Lucimar Sasso Vieira, Everthon Silva Fonseca, Fabricio Lopes Sanchez, Paulo Rogério Scalassara, Carlos Dias Maciel, José Carlos Pereira, Shi-Huang Chen, Journal of Computational and Applied Mathematics 227, pp. 271-287, Available online Mar. 21, 2008.

"An accurate and rapid continuous wavelet dynamic time warping algorithm for end-to-end mapping in ultra-long hanopore sequencing", Renmin Han, Yu Li, Xin Gao, Sheng Wang, Bioinformatics, vol. 34, Sep. 8, 2018, pp. i722-i731.

"Peak alignment using wavelet pattern matching and differential evolution", Zhi-Min Zhang, Shan Chen and Yi-Zeng Liang, Talanta, vol. 83, Jan. 30, 2011, pp. 1108-1117.

"Comparisons of Five Algorithms for Chromatogram Alignment", Wei Jiang, Zhi-Min Zhang, YongHuan Yun, De-Jian Zhan, Yi-Bao Zheng, Yi-Zeng Liang, Zhen Yu Yang, Ling Yu, Chromatographia vol. 76, pp. 1067-1078, Published online Jul. 25, 2013.

"shapeDTW: shape Dynamic Time Warping", Jiaping Zhao, Laurent Itti, Available online Sep. 14, 2017.

Office Action in corresponding Chinese Patent Application No. 202111147698.6 dated Aug. 16, 2023, with English machine translation.

Liao et al.; Study on Electro-chromatography Signal Denoising of Low-voltage Capillary Electrophoresis Micro-chip Based on Generalized Morphological Filtering; Journal of Hubei University for Nationalities (Natural Science Edition), vol. 32, No. 4; Dec. 2014; pp. 439-P444.

* cited by examiner

F I G. 2
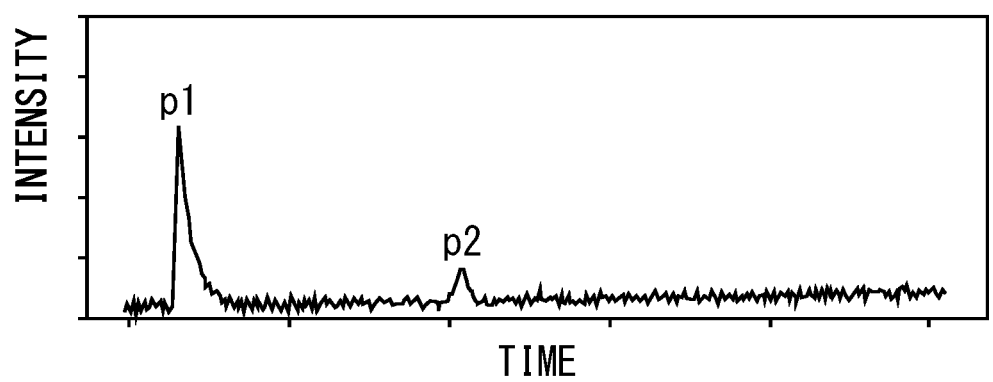
F I G. 3
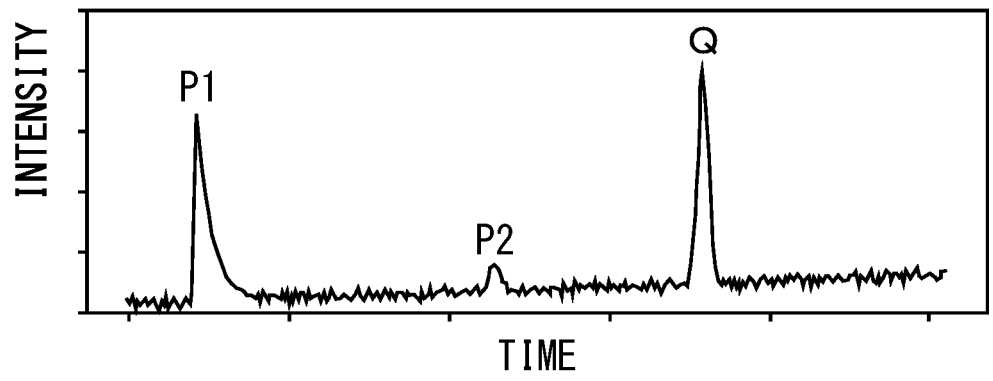

WAVEFORM PROCESSING DEVICE FOR CHROMATOGRAM AND WAVEFORM PROCESSING METHOD FOR CHROMATOGRAM

BACKGROUND

Technical Field

The present invention relates to a waveform processing device for a chromatogram and a waveform processing method for a chromatogram.

Description of Related Art

A liquid chromatograph has been known as a device that separates a substance included in a sample into different components. For example, in JP 2017-187319 A, a spectrometer using high-speed liquid chromatography is described. In the spectrometer, an analyte to be analyzed is supplied as a sample to an analysis column together with an eluent. A sample that has been introduced into the analysis column is eluted into components and detected by a detector. Based on a result of detection by the detector, a chromatogram representing the relationship between a retention time of a sample component and a detection intensity is created.

In a chromatogram, a variation in baseline caused by background appears. In a case where a variation in baseline is large, a result of analysis may be inaccurate. As such, in JP 2017-187319 A, a reference chromatogram that enables confirmation of background data is measured. A variation in baseline is excluded by subtraction of background data on which predetermined correction has been performed from a chromatogram of analyte.

SUMMARY

Since a deviation is present between a chromatogram of analyte and a reference chromatogram, even in a case where a chromatogram on which the above-mentioned subtraction processing has been executed is used, a result of analysis may be inaccurate.

An object of the present invention is to provide a waveform processing device for a chromatogram and a waveform processing method for a chromatogram, for producing a chromatogram that enables an accurate analysis.

One aspect of the present invention relates to a waveform processing device for a chromatogram that includes a sample chromatogram acquirer that acquires a sample chromatogram produced by measurement of a mobile phase into which a sample has been injected, a background chromatogram acquirer that acquires a background chromatogram produced by measurement of a mobile phase into which a sample is not injected or a mobile phase into which a control sample is injected, an alignment processor that performs alignment of a sample chromatogram and a background chromatogram by causing baselines of the sample chromatogram acquired by the sample chromatogram acquirer and the background chromatogram acquired by the background chromatogram acquirer to coincide with each other, and a subtraction processor that executes subtraction processing of subtracting a background chromatogram from a sample chromatogram after alignment by the alignment processor.

Another aspect of the present invention relates to a waveform processing method for a chromatogram that includes acquiring a sample chromatogram produced by measurement of a mobile phase into which a sample has been injected, acquiring a background chromatogram produced by measurement of a mobile phase into which a sample is not injected or a mobile phase into which a control sample has been injected, performing alignment of a sample chromatogram and a background chromatogram by causing baselines of the acquired sample chromatogram and the acquired background chromatogram to coincide with each other, and performing subtraction processing of subtracting a background chromatogram from a sample chromatogram after alignment.

With the present invention, a chromatogram that enables an accurate analysis can be produced.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 2 is a diagram showing one example of a background chromatogram;

FIG. 3 is a diagram showing one example of a sample chromatogram;

DETAILED DESCRIPTION

(1) Configuration of Analysis System

Figure 1:
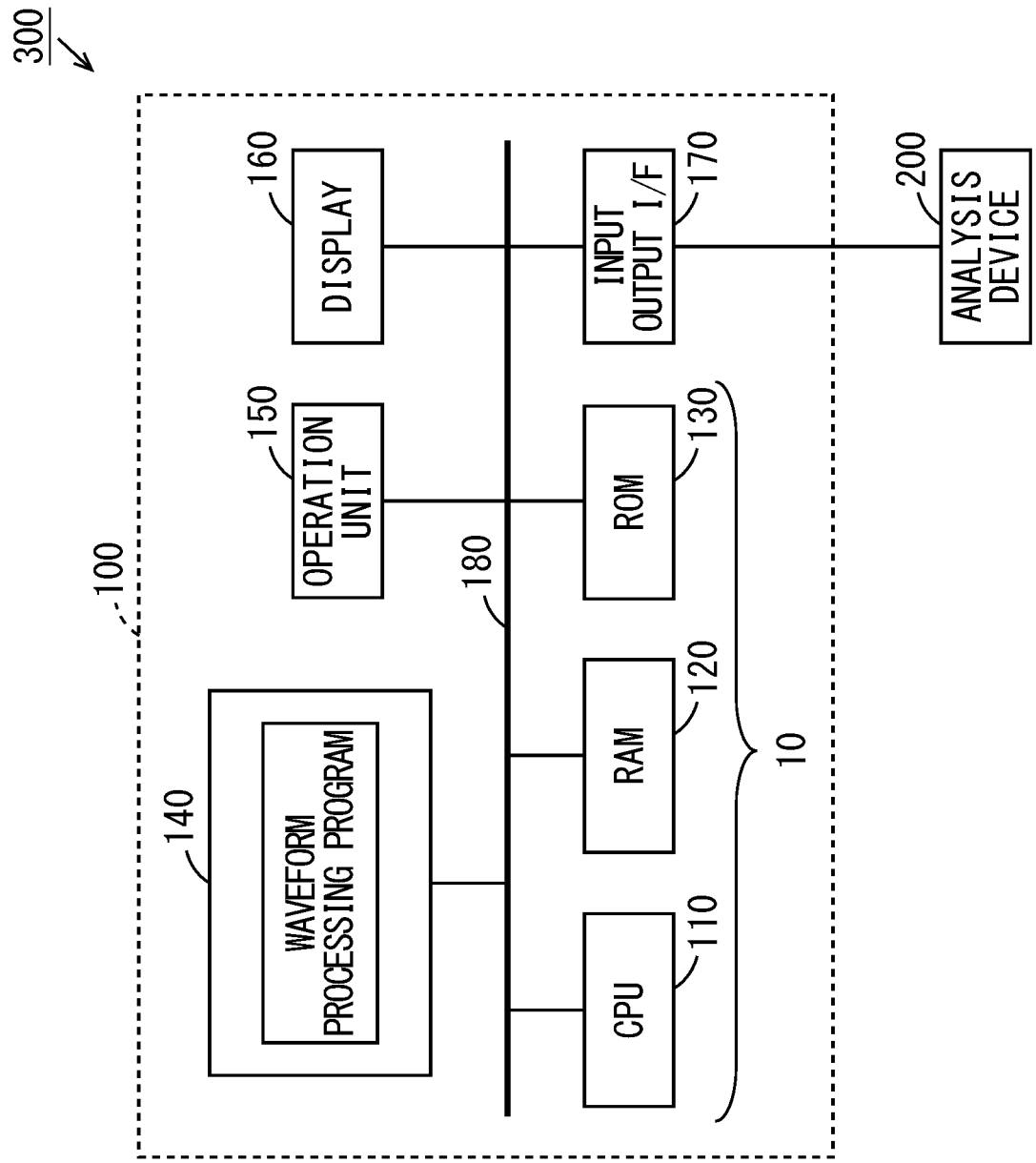
FIG. 1 is a diagram showing the configuration of an analysis system including a waveform processing device for a chromatogram according to one embodiment of the present invention.

A waveform processing device for a chromatogram and a waveform processing method for a chromatogram according to embodiments of the present invention will be described below in detail with reference to the drawings. FIG. 1 is a diagram showing the configuration of an analysis system including the waveform processing device for a chromatogram according to one embodiment of the present invention. As shown in FIG. 1, the analysis system 300 includes a control device 100 and an analysis device 200.

The control device 100 is constituted by a CPU (Central Processing Unit) 110, a RAM (Random Access Memory) 120, a ROM (Read Only Memory) 130, a storage 140, an operation unit 150, a display 160 and an input output I/F (interface) 170. The CPU 110, the RAM 120, the ROM 130, the storage 140, the operation unit 150, the display 160 and the input output I/F 170 are connected to a bus 180. The CPU 110, the RAM 120 and the ROM 130 constitute the waveform processing device 10 for a chromatogram (hereinafter abbreviated as the waveform processing device 10).

The RAM 120 is used as a work area for the CPU 110. A system program is stored in the ROM 130. The storage 140 includes a storage medium such as a hard disc or a semiconductor memory. A waveform processing program for executing waveform processing on a chromatogram is stored in the storage 140. The waveform processing program may be stored in the ROM 130 or an external storage device. The CPU 110 executes the waveform processing program stored in the storage 140 or the like on the RAM 120, whereby waveform processing is executed on a chromatogram.

The operation unit 150 is an input device such as a keyboard, a mouse or a touch panel, and is operated by a user who provides a predetermined instruction to the waveform processing device 10. The display 160 is a display device such as a liquid crystal display device and displays a chromatogram on which the waveform processing device 10 has executed waveform processing. The input output I/F 170 is connected to the analysis device 200.

The analysis device 200 includes a liquid chromatograph or a liquid chromatograph mass spectrometer that uses an eluent as a mobile phase, for example. The analysis device 200 may include a gas chromatograph or a gas chromatograph mass spectrometer that uses a carrier gas as a mobile phase. Alternatively, the analysis device 200 may include a supercritical fluid chromatograph or a supercritical fluid chromatograph mass spectrometer that uses a supercritical fluid as a mobile phase.

The analysis device 200 produces a chromatogram (hereinafter referred to as a background chromatogram) by measuring a mobile phase into which a sample is not injected. FIG. 2 is a diagram showing one example of a background chromatogram. As shown in FIG. 2, in the background chromatogram, zero or more than zero (two in the example of FIG. 2) false peaks p1, p2 that are not caused by a sample appear, and a variation in baseline appears. A false peak is caused by injection shock, a mobile phase, a gradient condition, an impurity component or the like.

Further, the analysis device 200 produces a chromatogram (hereinafter referred to as a sample chromatogram) by measuring a mobile phase into which a sample to be analyzed has been injected. FIG. 3 is a diagram showing one example of a sample chromatogram. As shown in FIG. 3, in the sample chromatogram, one or more than one (one in the example of FIG. 3) peaks Q caused by a sample appear in addition to false peaks P1, P2 that are respectively similar to the above-mentioned false peaks p1, p2 and a variation in baseline.

The analysis device 200 supplies a produced background chromatogram and a produced sample chromatogram to the control device 100. A background chromatogram may be produced before production of a sample chromatogram, or may be produced between production of a plurality of sample chromatograms by batch processing.

(2) Waveform Processing Device

Figure 4:
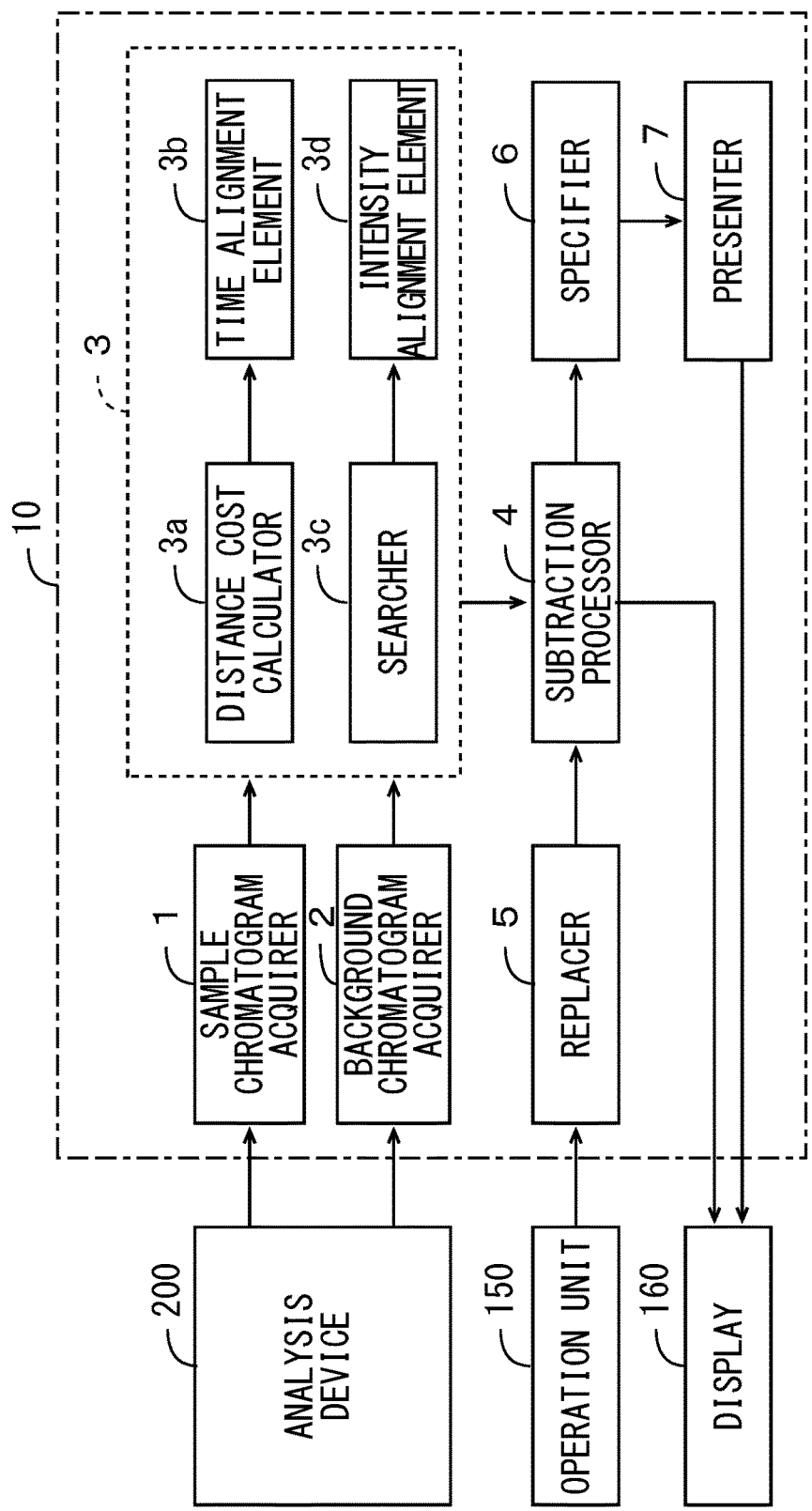
FIG. 4 is a diagram showing the configuration of a waveform processing device.

FIG. 4 is a diagram showing the configuration of the waveform processing device 10. As shown in FIG. 4, the waveform processing device 10 includes a sample chromatogram acquirer 1, a background chromatogram acquirer 2, an alignment processor 3, a subtraction processor 4, a replacer 5, a specifier 6 and a presenter 7 as functions. The functions of the waveform processing device 10 are implemented by execution of the waveform processing program stored in the storage 140 or the like by the CPU 110 of FIG. 1. Part or all of the functions of the waveform processing device 10 may be implemented by hardware such as an electronic circuit.

The sample chromatogram acquirer 1 acquires a sample chromatogram from the analysis device 200. The background chromatogram acquirer 2 acquires a background chromatogram from the analysis device 200. The alignment processor 3 causes baselines of a sample chromatogram acquired by the sample chromatogram acquirer 1 and a background chromatogram acquired by the background chromatogram acquirer 2 to coincide with each other such that the shapes of a peak or a drift match. Thus, alignment of a sample chromatogram and a background chromatogram is performed.

In the present example, the alignment processor 3 includes a distance cost calculator 3a, a time alignment element 3b, a searcher 3c and an intensity alignment element 3d, and causes baselines to coincide with each other by estimating the positions of peaks (including a false peak) in a sample chromatogram and a background chromatogram. The distance cost calculator 3a calculates a distance cost between a sample chromatogram and a background chromatogram using Dynamic Time Warping (DTW).

Specifically, in a background chromatogram, the distance cost calculator 3a determines one or a plurality of points respectively and tentatively corresponding to a plurality of points in a sample chromatogram as tentative corresponding points. One point in a sample chromatogram may correspond to a plurality of adjacent tentative corresponding points in a background chromatogram. Alternatively, a plurality of adjacent points in a sample chromatogram may correspond to one tentative corresponding point in a background chromatogram.

Further, the distance cost calculator 3a calculates the distance between each point in a sample chromatogram and a tentative corresponding point in a background chromatogram, and calculates the sum of distances that are calculated in regard to a plurality of points in the sample chromatogram as a distance cost. Here, in a case where a distance included in a distance cost exceeds a predetermined upper limit value, the distance cost calculator 3a estimates a point in a sample chromatogram which is a start point for the distance or a tentative corresponding point in a background chromatogram that is an end point for the distance as a peak, sets the distance to a certain value and calculates a distance cost.

An upper limit value of distance is twice as much as a noise amount in the analysis device 200 that produces a sample chromatogram and a background chromatogram, for example. In calculation of a distance cost, the distance cost calculator 3a may estimate a noise amount from a background chromatogram using Gaussian progress regression, or may estimate a noise amount from a known device accuracy error of the analysis device 200. As described above, it is possible to calculate a distance cost with a peak caused by a sample and a false peak included in only one of a sample chromatogram and a background chromatogram excluded, by setting a distance exceeding an upper limit value to a certain value.

The time alignment element 3b updates a tentative corresponding point in a background chromatogram in regard to each point in a sample chromatogram. Further, the time alignment element 3b determines a tentative corresponding point in a case where a distance cost is a minimum as a determined corresponding point. Thus, alignment in a time direction is performed based on each point in a sample chromatogram and a determined corresponding point in a background chromatogram.

In a case where a deviation in baseline between a sample chromatogram and a background chromatogram in an intensity direction is large, it may not be possible to calculate a reasonable distance cost since most distances exceed an upper limit value. As such, the searcher 3c adds a deformation function for deforming a background chromatogram to the background chromatogram. A deformation function is provided by the following formula (1), for example. In the formula (1), t is the time, and a, b are respectively a direct-current component and a time gradient in a background chromatogram.

[Formula 1]

$$g(t)=a+b \cdot t \tag{1}$$

The searcher 3c searches for values of parameters a, b in the deformation function g(t) such that a variation in baseline in a background chromatogram with respect to a baseline in a sample chromatogram decreases. A value of the parameter b may be 0. Further, the deformation function g(t) is not limited to the formula (1) and may include a non-linear term. The intensity alignment element 3d performs alignment in an intensity direction of a sample chromatogram and a background chromatogram to which the deformation function g(t) has been added.

The subtraction processor 4 executes subtraction processing of subtracting the background chromatogram from the sample chromatogram after alignment is performed by the alignment processor 3. The subtraction processor 4 may cause the display 160 to display the sample chromatogram after subtraction processing. In response to an instruction from a user, the replacer 5 replaces a portion having an intensity equal to or smaller than a predetermined intensity with 0 in the sample chromatogram on which the subtraction processing has been executed by the subtraction processor 4. A predetermined intensity may be twice as much as a noise amount in the analysis device 200, for example. The user can provide an instruction for the above-mentioned replacement by operating the operation unit 150.

The specifier 6 specifies a peak derived from a sample based on the sample chromatogram on which the subtraction processing has been executed by the subtraction processor 4. The presenter 7 causes the display 160 to visibly display a peak derived from a sample based on a result of specification provided by the specifier 6 in the sample chromatogram before the subtraction processing is executed.

(3) Inventive Example

Figure 5:
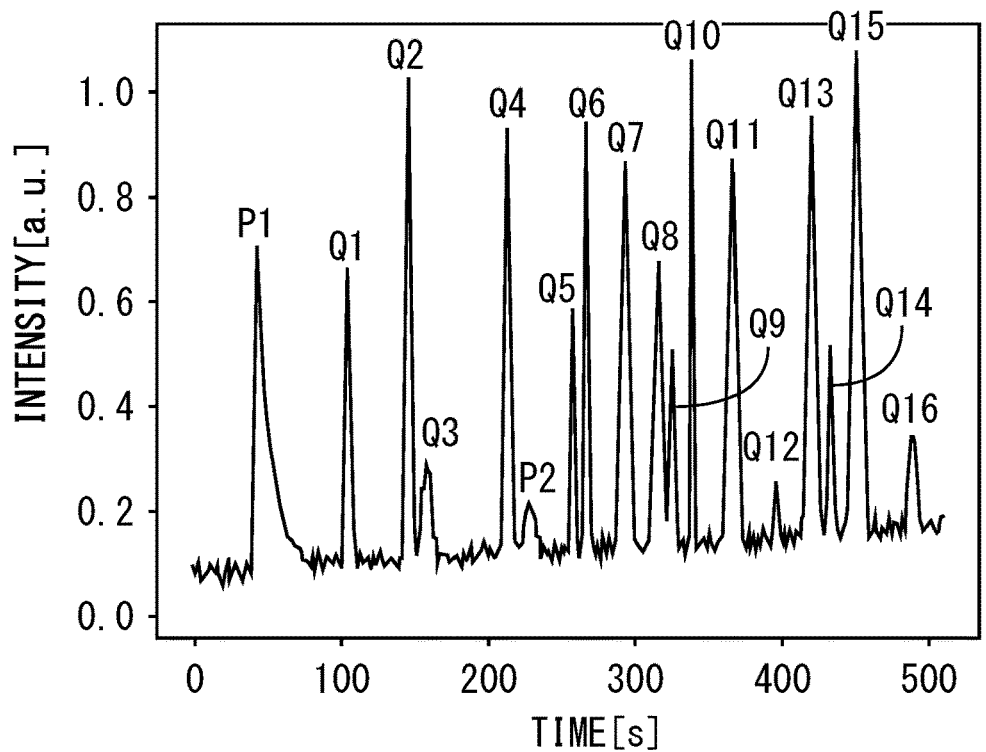
FIG. 5 is a diagram showing a sample chromatogram in an inventive example.

FIG. 5 is a diagram showing a sample chromatogram in an inventive example. The sample chromatogram of FIG. 5 is acquired by the sample chromatogram acquirer 1 of FIG. 4. As shown in FIG. 5, in the sample chromatogram in the inventive example, two false peaks P1, P2 and sixteen peaks Q1 to Q16 appear, and a variation in baseline appears.

Figure 6:
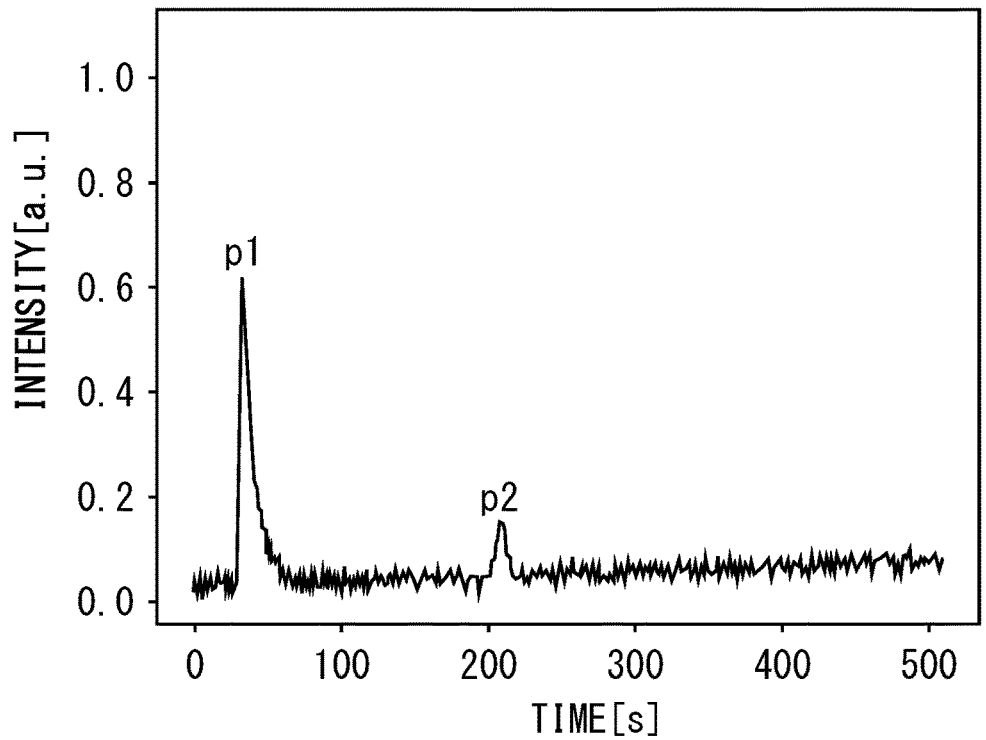
FIG. 6 is a diagram showing a background chromatogram in the inventive example.

FIG. 6 is a diagram showing a background chromatogram in the inventive example. The background chromatogram of FIG. 6 is acquired by the background chromatogram acquirer 2 of FIG. 4. As shown in FIG. 6, in the background chromatogram in the inventive example, two false peaks p1, p2 appear, and a variation in baseline appears.

Figure 7:
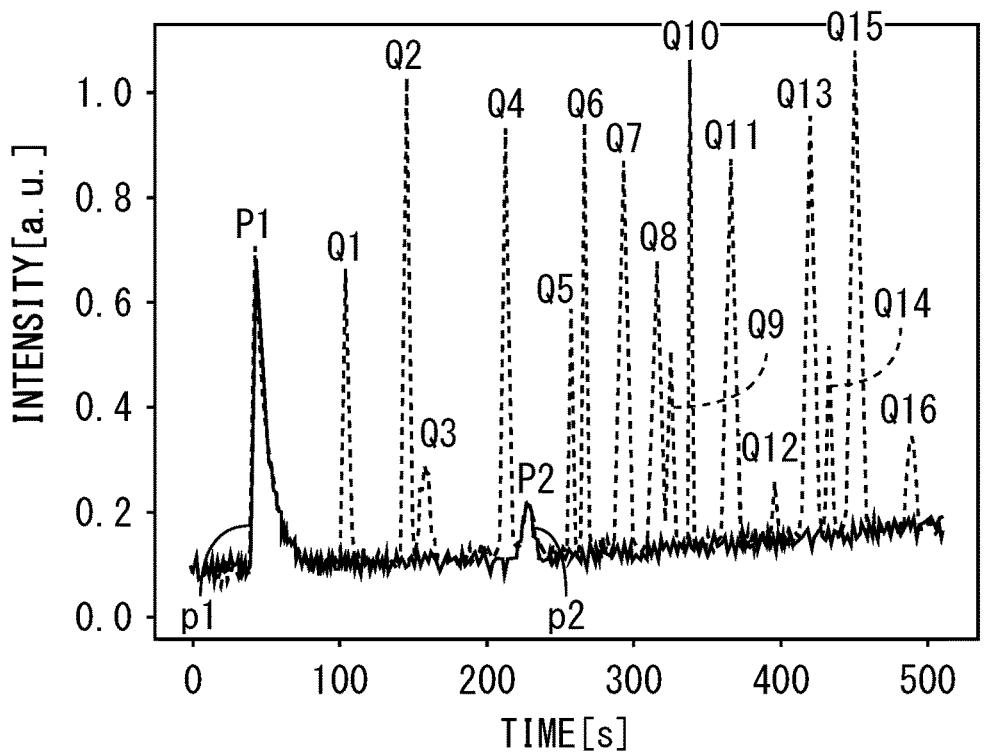
FIG. 7 is a diagram showing a sample chromatogram and a background chromatogram after alignment in the inventive example.

FIG. 7 is a diagram showing a sample chromatogram and a background chromatogram after alignment in the inventive example. In each of FIG. 7 and subsequent FIGS. 8 and 9, a sample chromatogram is indicated by a dotted line. In alignment performed by the alignment processor 3 of FIG. 4, the positions of the peaks Q1 to Q16 are estimated as described above. Further, a distance cost is calculated with the estimated peaks Q1 to Q16 excluded.

The sample chromatogram of FIG. 5 correspond to the background chromatogram of FIG. 6 such that the calculated distance cost is a minimum. Thus, as shown in FIG. 7, alignment of the sample chromatogram and the background chromatogram is performed, such that the positions of the false peaks P1, P2 and the positions of the false peaks p1, p2 respectively coincide with each other and the baselines coincide with each other.

Figure 8:
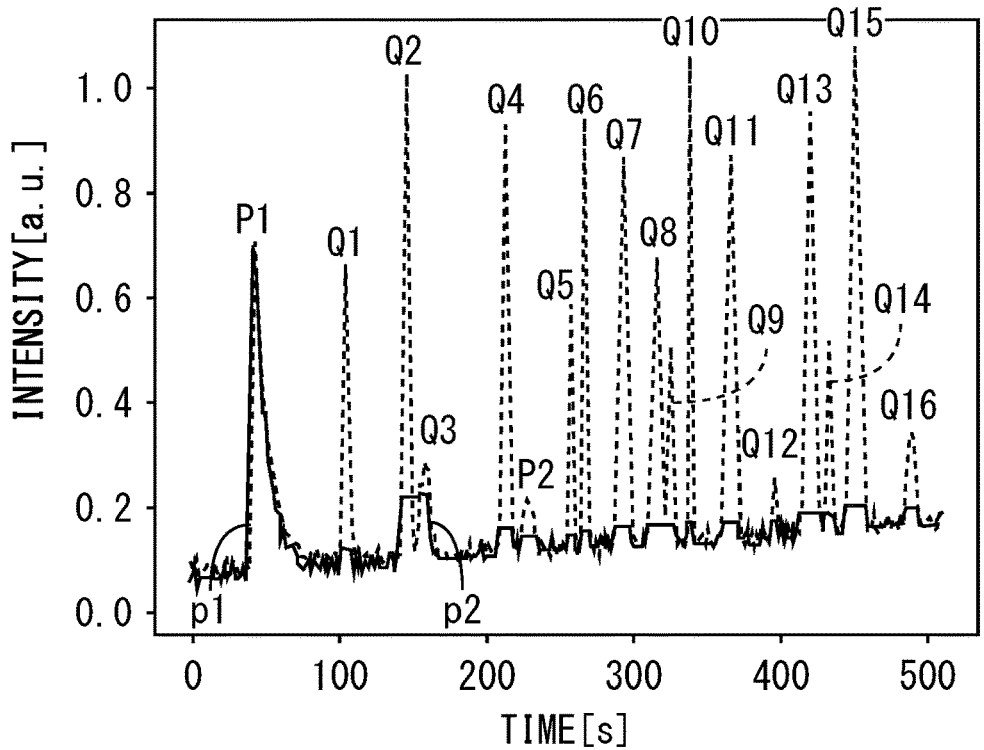
FIG. 8 is a diagram showing a sample chromatogram and a background chromatogram after alignment in a first reference example.

FIG. 8 is a diagram showing a sample chromatogram and a background chromatogram after alignment in a first reference example. In the first reference example, peaks Q1 to Q16 are not excluded, and the deformation function g(t) is added to the background chromatogram. In this case, as shown in FIG. 8, although the position of a false peak p1 coincides with the position of a false peak P1, the position of a false peak p2 coincides with not the position of a false peak P2 but the positions of peaks Q2, Q3. Therefore, alignment of the sample chromatogram and the background chromatogram is inaccurate.

Figure 9:
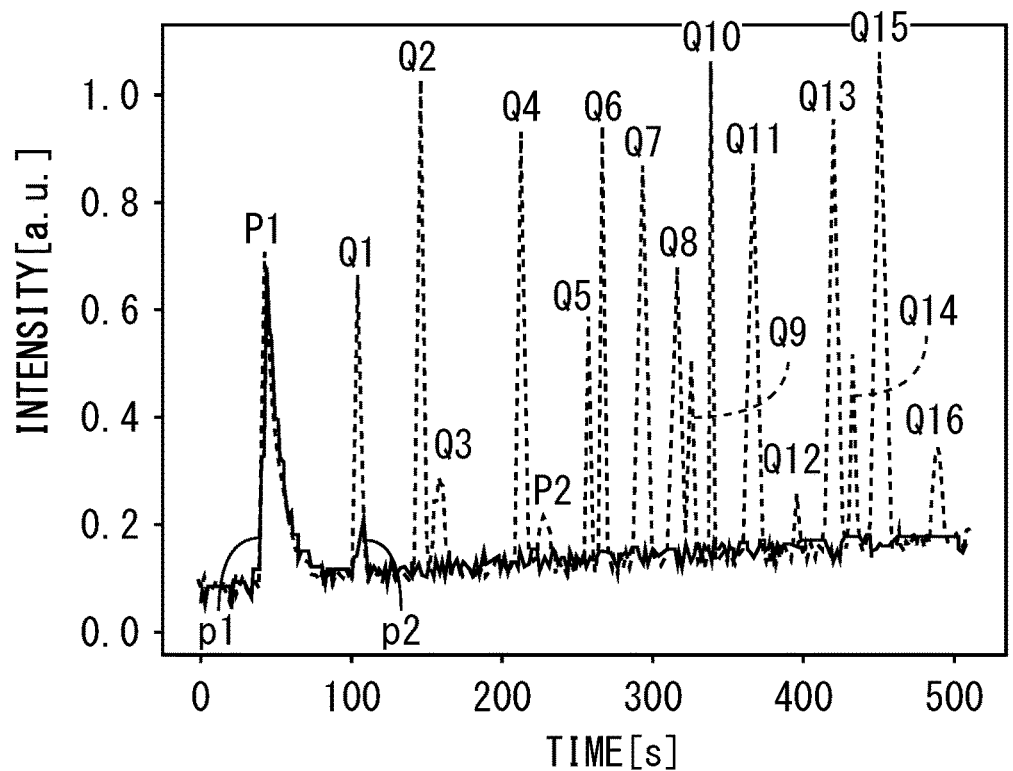
FIG. 9 is a diagram showing a sample chromatogram and a background chromatogram after alignment in a second reference example.

FIG. 9 is a diagram showing a sample chromatogram and a background chromatogram after alignment in a second reference example. Depending on a search count for a tentative corresponding point in the background chromatogram, because a local solution is present, alignment may be performed with the position of a false peak in the background chromatogram coinciding with the position of a non-corresponding peak in the sample chromatogram. In the second reference example, as shown in FIG. 9, alignment is performed with the position of a false peak p2 coinciding with the position of a non-corresponding peak Q1.

As such, in calculation of a distance cost, in a case where any point in the sample chromatogram deviates from a tentative corresponding point in the background chromatogram by a period of time equal to or larger than a predetermined period of time, the distance cost calculator 3a of FIG. 4 may replace the distance cost including the distance between the two points with infinity. Thus, alignment is prevented from being performed with the position of a false peak in the background chromatogram coinciding with the position of a non-corresponding peak in the sample chromatogram.

Alternatively, the distance cost calculator 3a may increase a distance cost in accordance with the magnitude of a time deviation between any point in the sample chromatogram and a tentative corresponding point in the background chromatogram instead of replacement of the distance cost with infinity. For example, a cost C expressed by the following formula (2) may be added to a distance cost. In the formula (2), $t_1$ is the time at any point in a sample chromatogram, and $t_2$ is the time at a tentative corresponding point in a background chromatogram.

[Formula 2]

$$C=(t_1-t_2)^2 \tag{2}$$

Figure 10:
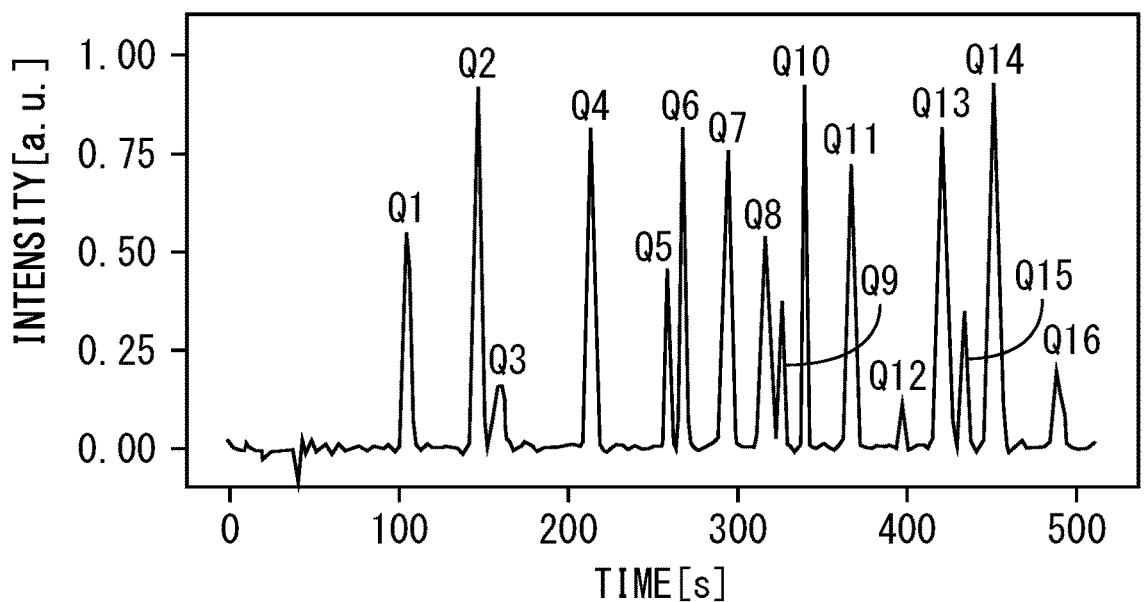
FIG. 10 is a diagram showing a sample chromatogram after subtraction processing in the inventive example.

FIG. 10 is a diagram showing a sample chromatogram after subtraction processing in the inventive example. Subtraction processing of subtracting a background chromatogram from a sample chromatogram of FIG. 7 is executed by the subtraction processor 4 of FIG. 4. Thus, as shown in FIG. 10, false peaks P1, P2 and a variation in baseline are excluded from the sample chromatogram. As a result, only the peaks Q1 to Q16 caused by a sample remain in the sample chromatogram.

Figure 11:
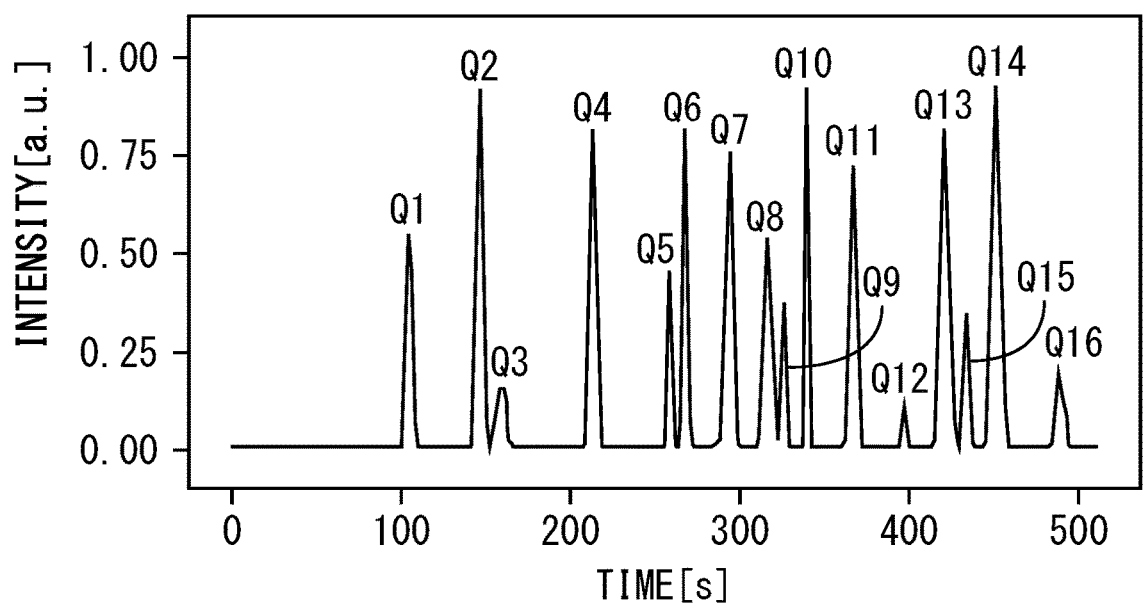
FIG. 11 is a diagram showing a sample chromatogram after replacement in the inventive example.

FIG. 11 is a diagram showing a sample chromatogram after replacement in the inventive example. In a case where wishing to remove noise in the sample chromatogram of FIG. 10 on which subtraction processing has been executed, the user provides an instruction for replacement by operating the operation unit 150 of FIG. 4. In this case, as shown in FIG. 11, in the sample chromatogram, a portion having an intensity equal to or smaller than a predetermined intensity is replaced with 0 by the replacer 5 of FIG. 4. Thus, the user can observe the sample chromatogram from which noise has been removed.

Figure 12:
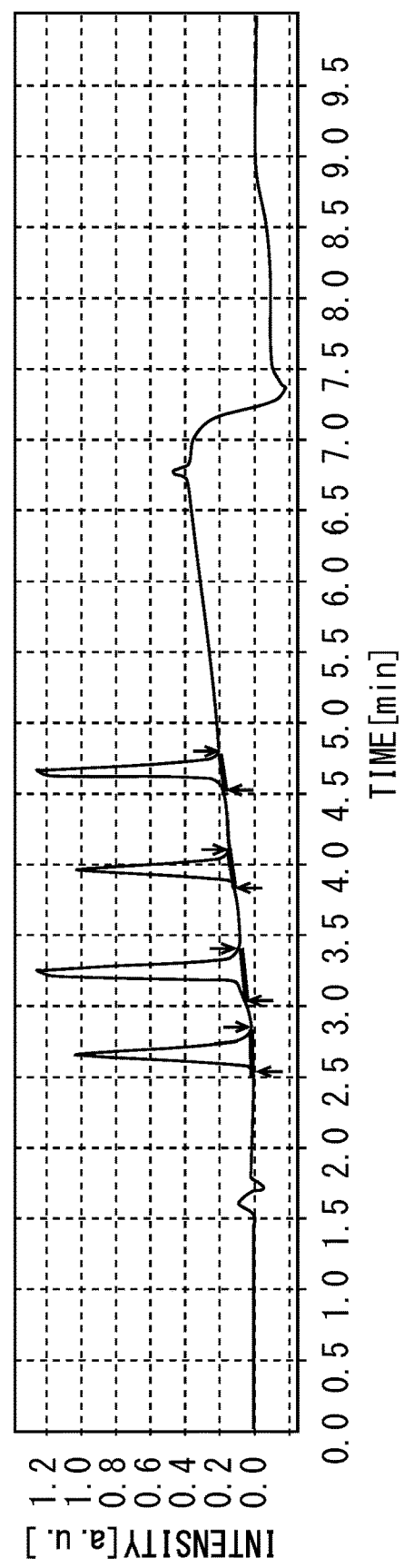
FIG. 12 is a diagram showing a sample chromatogram presented by a presenter of FIG. 4.

FIG. 12 is a diagram showing a sample chromatogram presented by the presenter 7 of FIG. 4. As shown in FIG. 12, the sample chromatogram before subtraction processing is executed is presented by the presenter 7. In the sample chromatogram, a peak derived from a sample specified by the specifier 6 of FIG. 4 is visibly displayed based on a sample chromatogram on which subtraction processing has been executed. In the example of FIG. 12, a start position and an end position of each peak are indicated by arrows. Thus, the user can easily identify a peak derived from a sample in an original sample chromatogram.

(4) Waveform Processing

Figure 13:
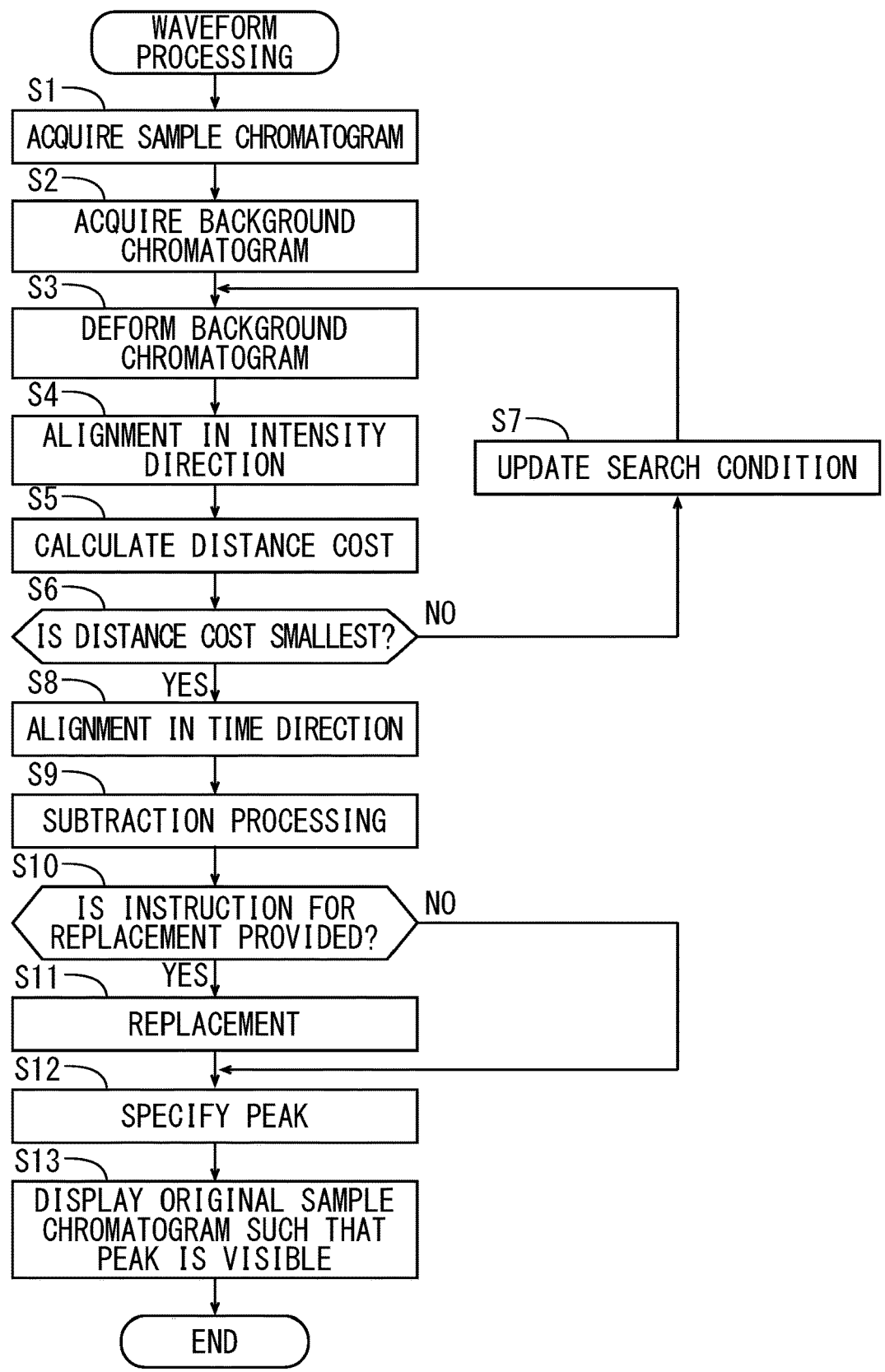
FIG. 13 is a flowchart showing waveform processing to be executed by a waveform processing device of FIG. 4.

FIG. 13 is a flowchart showing waveform processing to be executed by the waveform processing device 10 of FIG. 4. The waveform processing of FIG. 13 is executed by execution of the waveform processing program stored in the ROM 130, the storage 140 or the like by the CPU 110 of FIG. 1 on the RAM 120. The waveform processing will be described below with reference to the waveform processing device 10 of FIG. 4 and the flowchart of FIG. 13.

First, the sample chromatogram acquirer 1 acquires a sample chromatogram from the analysis device 200 (step S1). The background chromatogram acquirer 2 acquires a background chromatogram from the analysis device 200 (step S2). One of the steps S1, S2 may be executed first, or the steps S1, S2 may be executed at the same time.

Next, the searcher 3c deforms the background chromatogram acquired in the step S2 with use of the deformation function g(t) (step S3). Subsequently, the intensity alignment element 3d performs alignment in an intensity direction of the sample chromatogram acquired in the step S1 and the background chromatogram deformed in the step S3 (step S4).

Thereafter, the distance cost calculator 3a calculates a distance cost by determining a tentative corresponding point in the background chromatogram (step S5). Here, the time alignment element 3b determines whether the distance cost is a minimum (step S6). In a case where the distance cost is not a minimum, the alignment processor 3 updates a search condition (step S7) and returns to the step S3. An update of a search condition includes at least one of an update of a tentative corresponding point by the time alignment element 3b and an update of a parameter of the deformation function g(t).

The steps S3 to S7 are repeated until the distance cost is a minimum. A search count may be predetermined. In a case where the distance cost is a minimum, the time alignment element 3b performs alignment in a time direction of the sample chromatogram and the background chromatogram by determining a determined corresponding point in the background chromatogram (step S8).

Next, the subtraction processor 4 executes subtraction processing of subtracting the background chromatogram from the sample chromatogram after the alignment in the step S8 (step S9). Subsequently, the replacer 5 determines whether the user has provided an instruction for replacement (step S10). In a case where an instruction for replacement has not been provided, the replacer 5 proceeds to the step S12. In a case where an instruction for replacement has been provided, the replacer 5 replaces a portion having an intensity equal to or smaller than a predetermined intensity with 0 in the sample chromatogram on which the subtraction processing has been executed in the step S9 (step S11) and proceeds to the step S12.

In the step S12, the specifier 6 specifies a peak derived from a sample based on the sample chromatogram on which the subtraction processing has been executed in the step S9 or the sample chromatogram on which replacement has been performed in the step S11 (step S12). Finally, the presenter 7 causes the display 160 to display the original sample chromatogram acquired in the step S1 such that the peak specified in the S12 is visible (step S13) and ends the waveform processing.

(5) Effects

In the waveform processing device 10 according to the present embodiment, a sample chromatogram and a background chromatogram are aligned by the alignment processor 3 such that baselines coincide with each other. In this state, because substrate processing of subtracting the background chromatogram from the sample chromatogram is executed by the subtraction processor 4, a peak not caused by a sample or a variation in baseline is hardly included in the sample chromatogram. Thus, a chromatogram that enables an accurate analysis can be produced.

In alignment, one or a plurality of tentative corresponding points in the background chromatogram are determined by the distance cost calculator 3a, and the sum of distances between each point in the sample chromatogram and a tentative corresponding point in the background chromatogram is calculated as a distance cost. A tentative corresponding point in the background chromatogram is updated by the time alignment element 3b, and alignment in the time direction is performed based on a tentative corresponding point in a case where the distance cost is a minimum, and each point in the sample chromatogram.

Here, in a case where a distance included in the calculated distance cost exceeds a predetermined upper limit value, the distance is set to a certain value, and a distance cost is calculated. In this case, the distance cost is calculated with a peak caused by a sample, and a false peak included in only one of the sample chromatogram and the background chromatogram excluded. Thus, alignment of the sample chromatogram and the background chromatogram can be performed accurately.

Further, in calculation of a distance cost, the searcher 3c searches for the deformation function g(t) that deforms the background chromatogram such that a variation in baseline in the background chromatogram with respect to the baseline in the sample chromatogram decreases. The intensity alignment element 3d performs alignment in the intensity direction of the sample chromatogram, and the background chromatogram to which the deformation function g(t) that has been searched by the searcher 3c has been applied.

With this configuration, even in a case where a deviation in baseline between the sample chromatogram and the background chromatogram in the intensity direction is large, the sample chromatogram and the background chromatogram correspond to each other more accurately. Thus, a chromatogram that enables a more accurate analysis can be produced.

(6) Other Embodiments (a) While the analysis device 200 produces a background chromatogram by measuring a mobile phase to which a sample is not injected in the above-mentioned embodiment, the embodiment is not limited to this. The analysis device 200 may produce a background chromatogram by measuring a mobile phase into which a control sample has been injected. A control sample is a known sample to be used for confirmation of quantitativity or reproducibility of measurement.

In a case where a control sample is included in a mobile phase, a known peak caused by the control sample further appears in a background chromatogram. The alignment processor 3 performs alignment of a sample chromatogram and the background chromatogram with the peak derived from the control sample excluded from the background chromatogram. With this configuration, even in a case where a background chromatogram is produced with use of a control sample, alignment can be performed easily.

(b) In the above-mentioned embodiment, the background chromatogram acquirer 2 may acquire a plurality of background chromatograms. Further, the background chromatogram acquirer 2 may acquire a representative background chromatogram that represents a plurality of background chromatograms by calculating a statistic of the plurality of background chromatograms.

In this case, the alignment processor 3 performs alignment of a sample chromatogram and the representative background chromatogram. In the representative background chromatogram, a peak that fortuitously occurs is hardly included. Thus, a chromatogram that enables a more accurate analysis can be produced. A statistic may be an average value or another statistic such as a weighted average.

(c) While the deformation function g(t) is applied to a background chromatogram in the above-mentioned embodiment, the embodiment is not limited to this. In a case where a deviation in baseline between a sample chromatogram and a background chromatogram in an intensity direction is small, the deformation function g(t) does not have to be applied to the background chromatogram. In this case, the alignment processor 3 does not include the searcher 3c or the intensity alignment element 3d.

(d) While a process of replacing a distance cost with infinity or a process of adding a cost C to a distance cost is executed in the above-mentioned embodiment, the embodiment is not limited to this. In a case where a search count of a tentative corresponding point is sufficiently large, the process of replacing a distance cost with infinity or the process of adding a cost C to a distance cost does not have to be executed.

(e) While the waveform processing device 10 includes the replacer 5, the specifier 6 and the presenter 7 in the above-mentioned embodiment, the embodiment is not limited to this. In a case where the waveform processing device 10 does not have to be configured to be capable of replacing a portion having an intensity that is equal to or smaller than a predetermined intensity of a sample chromatogram after subtraction processing with 0, the waveform processing device 10 does not have to include the replacer 5. Further, in an original sample chromatogram, in a case where a peak derived from a sample does not have to be presented to be visible, the waveform processing device 10 does not have to include the specifier 6 or the presenter 7.

(7) Aspects

It is understood by those skilled in the art that the plurality of above-mentioned illustrative embodiments are specific examples of the below-mentioned aspects.

(Item 1) A waveform processing device for a chromatogram according to one aspect may include a sample chromatogram acquirer that acquires a sample chromatogram produced by measurement of a mobile phase into which a sample has been injected, a background chromatogram acquirer that acquires a background chromatogram produced by measurement of a mobile phase into which a sample is not injected or a mobile phase into which a control sample is injected, an alignment processor that performs alignment of a sample chromatogram and a background chromatogram by causing baselines of the sample chromatogram acquired by the sample chromatogram acquirer and the background chromatogram acquired by the background chromatogram acquirer to coincide with each other, and a subtraction processor that executes subtraction processing of subtracting a background chromatogram from a sample chromatogram after alignment by the alignment processor.

In the waveform processing device for a chromatogram, alignment of a sample chromatogram and a background chromatogram is performed such that their baselines coincide with each other. Because subtraction processing of subtracting a background chromatogram from a sample chromatogram is executed in this state, a peak not caused by a sample or a variation in baseline is hardly included in the sample chromatogram. Thus, a chromatogram that enables an accurate analysis can be produced.

(Item 2) The waveform processing device for a chromatogram according to item 1, wherein the alignment processor may cause baselines to coincide with each other by causing shapes of a peak or a drift in a sample chromatogram and a background chromatogram to match.

In this case, it is possible to cause baselines in a sample chromatogram and a background chromatogram to coincide with each other easily and accurately.

(Item 3) The waveform processing device for a chromatogram according to item 1 or item 2, wherein the background chromatogram acquirer may acquire a representative background chromatogram that represents a plurality of background chromatograms by calculating statistics of the plurality of background chromatograms, and the alignment processor may perform alignment of a sample chromatogram and a representative background chromatogram.

In this case, in a representative background chromatogram, a peak that fortuitously occurs is hardly included. Thus, a chromatogram that enables a more accurate analysis can be produced.

(Item 4) The waveform processing device for a chromatogram according to any one of items 1 to 3, wherein the alignment processor, in a case where a known peak derived from a control sample is included in a background chromatogram, may exclude the peak and perform alignment.

With this configuration, even in a case where a background chromatogram is produced with use of a control sample, alignment of a sample chromatogram and the background chromatogram can be performed easily.

(Item 5) The waveform processing device for a chromatogram according to item 1 to item 4, wherein the alignment processor may include a distance cost calculator that, in a background chromatogram, determines one or a plurality of points tentatively corresponding to each of a plurality of points in a sample chromatogram as tentative corresponding points, calculates a distance between each point in the sample chromatogram and a tentative corresponding point in the background chromatogram, and calculates a sum of distances calculated in regard to the plurality of points in the sample chromatogram as a distance cost, and a time alignment element that updates a tentative corresponding point in a background chromatogram in regard to each point in a sample chromatogram, determines a tentative corresponding point in a case where a distance cost is a minimum as a determined corresponding point and performs alignment in a time direction based on each point in the sample chromatogram and a determined corresponding point in the background chromatogram.

In this case, a sample chromatogram and a background chromatogram correspond to each other more accurately. Thus, a chromatogram that enables a more accurate analysis can be produced.

(Item 6) The waveform processing device for a chromatogram according to item 5, wherein the alignment processor may further include a searcher that searches for a deformation function that deforms a background chromatogram such that a variation in baseline of the background chromatogram with respect to a baseline of a sample chromatogram decreases, and an intensity alignment element that performs alignment in an intensity direction of a sample chromatogram and a background chromatogram to which a deformation function searched by the searcher is applied.

With this configuration, even in a case where a deviation in baseline between a sample chromatogram and a background chromatogram is large in an intensity direction, alignment of the sample chromatogram and the background chromatogram can be performed accurately.

(Item 7) The waveform processing device for a chromatogram according to item 5 or item 6, wherein the distance cost calculator, in a case where a distance included in a calculated distance cost exceeds a predetermined upper limit value, may set the distance to a certain value and calculates a distance cost.

In this case, a distance cost can be calculated with a peak caused by a sample excluded. Thus, alignment of a sample chromatogram and a background chromatogram can be performed accurately.

(Item 8) The waveform processing device for a chromatogram according to item 7, wherein the upper limit value may be a constant multiple of a noise amount in a chromatograph that produces a sample chromatogram and a background chromatogram.

In this case, an appropriate upper limit value for a distance can be defined easily based on a noise amount in a chromatograph.

(Item 9) The waveform processing device for a chromatogram according to item 8, wherein the distance cost calculator may estimate the noise amount from a background chromatogram.

In this case, an appropriate upper limit value for a distance can be easily defined based on a noise amount estimated from a background chromatogram.

(Item 10) The waveform processing device according to a chromatogram according to item 5 to item 9, wherein the distance cost calculator, in a case where any point in a sample chromatogram and a tentative corresponding point in regard to the any point in a background chromatogram deviate from each other by a period of time equal to or larger than a predetermined period of time, may replace a distance cost including a distance between the two points with infinity.

In this case, alignment is prevented from being performed with a position of peak in a background chromatogram coinciding with a position of non-corresponding peak in a sample chromatogram.

(Item 11) The waveform processing device for a chromatogram according to item 5 to item 9, wherein the distance cost calculator may increase a distance cost in accordance with magnitude of a time deviation between any point in a sample chromatogram and a tentative corresponding point in regard to the any point in a background chromatogram.

In this case, alignment is prevented from being performed with a position of peak in a background chromatogram coinciding with a position of non-corresponding peak in a sample chromatogram.

(Item 12) The waveform processing device for a chromatogram according to item 1 to item 11, may further include a replacer that replaces a portion having an intensity equal to or smaller than a predetermined intensity with 0 in a sample chromatogram on which subtraction processing has been executed by the subtraction processor.

In this case, the user can observe a sample chromatogram from which noise is removed.

(Item 13) The waveform processing device for a chromatogram according to item 1 to item 12, may further include a specifier that specifies a peak derived from a sample based on a sample chromatogram on which subtraction processing has been executed by the subtraction processor, and a presenter that visibly presents a peak derived from a sample based on a result of specification by the specifier in a sample chromatogram before subtraction processing is executed.

In this case, the user can easily identify a peak derived from a sample in an original sample chromatogram.

(Item 14) A waveform processing method for a chromatogram according to another aspect may include acquiring a sample chromatogram produced by measurement of a mobile phase into which a sample has been injected, acquiring a background chromatogram produced by measurement of a mobile phase into which a sample is not injected or a mobile phase into which a control sample has been injected, performing alignment of a sample chromatogram and a background chromatogram by causing baselines of the acquired sample chromatogram and the acquired background chromatogram to coincide with each other, and performing subtraction processing of subtracting a background chromatogram from a sample chromatogram after alignment.

With the waveform processing method for a chromatogram, a peak not caused by a sample or a variation in baseline is hardly included in a sample chromatogram after subtraction processing. Thus, a chromatogram that enables an accurate analysis can be produced.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A waveform processing device for a chromatogram, comprising a computer processor configured to:

acquire a sample chromatogram produced by measurement of a mobile phase into which a sample has been injected;
acquire a background chromatogram produced by measurement of a mobile phase into which a sample is not injected or a mobile phase into which a control sample is injected;
perform alignment of a sample chromatogram and a background chromatogram by causing baselines of the acquired sample chromatogram and the acquired background chromatogram to coincide with each other;
subtract the aligned background chromatogram from the aligned sample chromatogram;
search for a deformation function that deforms a background chromatogram such that a variation in baseline of the background chromatogram with respect to a baseline of a sample chromatogram decreases; and
perform alignment in an intensity direction of a sample chromatogram and a background chromatogram to which the searched deformation function is applied.

2. The waveform processing device for a chromatogram according to claim 1, wherein
the computer processor causes baselines to coincide with each other by causing shapes of a peak or a drift in a sample chromatogram and a background chromatogram to match.

3. The waveform processing device for a chromatogram according to claim 1, wherein
the computer processor acquires a representative background chromatogram that represents a plurality of background chromatograms by calculating statistics of the plurality of background chromatograms, and
performs the alignment of a sample chromatogram and a representative background chromatogram.

4. The waveform processing device for a chromatogram according to claim 1, wherein
the computer processor, in a case where a known peak derived from a control sample is included in a background chromatogram, excludes the peak and performs the alignment.

5. A waveform processing device for a chromatogram comprising:
a sample chromatogram acquirer that acquires a sample chromatogram produced by measurement of a mobile phase into which a sample has been injected;
a background chromatogram acquirer that acquires a background chromatogram produced by measurement of a mobile phase into which a sample is not injected or a mobile phase into which a control sample is injected;
an alignment processor that performs alignment of a sample chromatogram and a background chromatogram by causing baselines of the sample chromatogram acquired by the sample chromatogram acquirer and the background chromatogram acquired by the background chromatogram acquirer to coincide with each other; and
a subtraction processor that executes subtraction processing of subtracting a background chromatogram from the sample chromatogram aligned by the alignment processor,
wherein the alignment processor includes
a distance cost calculator that, in a background chromatogram, determines one or a plurality of points tentatively corresponding to each of a plurality of points in a sample chromatogram as tentative corresponding points, calculates a distance between each point in the sample chromatogram and a tentative corresponding point in the background chromatogram, and calculates a sum of distances calculated in regard to the plurality of points in the sample chromatogram as a distance cost,
a time alignment element that updates a tentative corresponding point in a background chromatogram in regard to each point in a sample chromatogram, determines a tentative corresponding point in a case where a distance cost is a minimum as a determined corresponding point and performs alignment in a time direction based on each point in the sample chromatogram and a determined corresponding point in the background chromatogram,
a searcher that searches for a deformation function that deforms a background chromatogram such that a variation in baseline of the background chromatogram with respect to a baseline of a sample chromatogram decreases, and
an intensity alignment element that performs alignment in an intensity direction of a sample chromatogram and a background chromatogram to which the deformation function searched by the searcher is applied.

6. The waveform processing device for a chromatogram according to claim 1, wherein
the computer processor, in a case where a distance included in a calculated distance cost exceeds a predetermined upper limit value, sets the distance to a certain value and calculates a distance cost.

7. The waveform processing device for a chromatogram according to claim 6, wherein
the upper limit value is a constant multiple of a noise amount in a chromatograph that produces a sample chromatogram and a background chromatogram.

8. The waveform processing device for a chromatogram according to claim 7, wherein
the computer processor estimates the noise amount from a background chromatogram.

9. The waveform processing device according to a chromatogram according to claim 1, wherein
the computer processor, in a case where any point in a sample chromatogram and a tentative corresponding point in regard to the any point in a background chromatogram deviate from each other by a period of time equal to or larger than a predetermined period of time, replaces a distance cost including a distance between the two points with infinity.

10. The waveform processing device for a chromatogram according to claim 1, wherein
the computer processor increases a distance cost in accordance with magnitude of a time deviation between any point in a sample chromatogram and a tentative corresponding point in regard to the any point in a background chromatogram.

11. The waveform processing device for a chromatogram according to claim 1, wherein
the computer processor replaces a portion having an intensity equal to or smaller than a predetermined intensity with 0 in a sample chromatogram on which subtraction processing has been executed.

12. The waveform processing device for a chromatogram according to claim 1, wherein
the computer processor specifies a peak derived from a sample based on a sample chromatogram on which the subtraction processing has been executed; and visibly presents a peak derived from a sample based on a result of the specification in a sample chromatogram before the subtraction processing is executed.

13. A waveform processing method for a chromatogram executed by a computer processor including:
  acquiring a sample chromatogram produced by measurement of a mobile phase into which a sample has been injected;
  acquiring a background chromatogram produced by measurement of a mobile phase into which a sample is not injected or a mobile phase into which a control sample has been injected;
  performing alignment of a sample chromatogram and a background chromatogram by causing baselines of the acquired sample chromatogram and the acquired background chromatogram to coincide with each other; and
  subtracting the aligned background chromatogram from the aligned sample chromatogram;
  wherein the alignment includes
  searching for a deformation function that deforms a background chromatogram such that a variation in baseline of the background chromatogram with respect to a baseline of a sample chromatogram decreases, and
  performing alignment in an intensity direction of a sample chromatogram and a background chromatogram to which the searched deformation function is applied.

14. The waveform processing device for a chromatogram according to claim 1, wherein
  the computer processor, in a background chromatogram, determines one or a plurality of points tentatively corresponding to each of a plurality of points in a sample chromatogram as tentative corresponding points, calculates a distance between each point in the sample chromatogram and a tentative corresponding point in the background chromatogram, and calculates a sum of distances calculated in regard to the plurality of points in the sample chromatogram as a distance cost, and
  updates the tentative corresponding point in the background chromatogram in regard to each point in the sample chromatogram, determines a tentative corresponding point in a case where the distance cost is a minimum as a determined corresponding point, and performs alignment in a time direction based on each point in the sample chromatogram and the determined corresponding point in the background chromatogram.

* * * * *